(12) United States Patent
Chandran et al.

(10) Patent No.: US 10,667,320 B2
(45) Date of Patent: May 26, 2020

(54) NETWORK CONNECTIVITY OF A BUILDING CONTROL DEVICE

(71) Applicant: Ademco Inc., Golden Valley, MN (US)

(72) Inventors: Anju Chandran, Bangalore (IN); Hemanth Padikkal Veettil, Parappanangadi (IN); Sunanda Kashayya Patrimath, Bangalore (IN); Venugopal Krishnappa, Bangalore (IN); Appar Vallikannu, Bangalore (IN)

(73) Assignee: Ademco Inc., Golden Valley, MN (US)

( * ) Notice: Subject to any disclaimer, the term of this patent is extended or adjusted under 35 U.S.C. 154(b) by 115 days.

(21) Appl. No.: 15/874,743

(22) Filed: Jan. 18, 2018

(65) Prior Publication Data
US 2019/0223248 A1    Jul. 18, 2019

(51) Int. Cl.
| | |
|---|---|
| H04W 76/19 | (2018.01) |
| H04W 12/06 | (2009.01) |
| G05B 15/02 | (2006.01) |
| H04W 12/00 | (2009.01) |
| H04L 12/28 | (2006.01) |
| H04W 4/80 | (2018.01) |
| H04W 84/12 | (2009.01) |
| H04W 4/70 | (2018.01) |

(52) U.S. Cl.
CPC ............ *H04W 76/19* (2018.02); *G05B 15/02* (2013.01); *H04L 12/2803* (2013.01); *H04W 12/003* (2019.01); *H04W 12/06* (2013.01); *H04W 4/70* (2018.02); *H04W 4/80* (2018.02); *H04W 84/12* (2013.01)

(58) Field of Classification Search
None
See application file for complete search history.

(56) References Cited

U.S. PATENT DOCUMENTS

| | | |
|---|---|---|
| 8,844,012 B1 | 9/2014 | Chan et al. |
| 9,351,158 B2 | 5/2016 | Wright et al. |
| 9,648,577 B1 | 5/2017 | Bradish |

(Continued)

OTHER PUBLICATIONS

Emerson Electric Co., "Sensei Support > Wi-Fi Thermostat > Connectivity > I Replaced My Old Router. How Do I Reconect my Sensei to Wi-Fi?," 5 pages, 2017.

(Continued)

*Primary Examiner* — Otis L Thompson, Jr.
(74) *Attorney, Agent, or Firm* — Shumaker & Sieffert, P.A.

(57) ABSTRACT

A building control device comprising a wireless interface and a controller configured to monitor when the wireless interface becomes disconnected from the network. When the wireless interface becomes disconnected from the network, the controller may attempt to reconnect the wireless interface to the network and if successful, return to monitoring for when the wireless interface becomes disconnected from the network. If not successful, the controller may switch the wireless interface into a configuration mode to establish a direct wireless connection with a remote device, receive updated network credentials from the remote device while in the configuration mode, exit the configuration mode, and connect the wireless interface to the network or another network using the updated network credentials.

20 Claims, 11 Drawing Sheets

(56) References Cited

U.S. PATENT DOCUMENTS

| | | | |
|---|---|---|---|
| 2013/0094444 A1 | 4/2013 | Lai et al. | |
| 2013/0272164 A1 | 10/2013 | Leonardos et al. | |
| 2015/0071216 A1* | 3/2015 | Ilsar | H04W 48/12 370/329 |
| 2015/0124791 A1* | 5/2015 | Mazandarany | H04W 12/04 370/338 |
| 2016/0037436 A1* | 2/2016 | Spencer | H04W 48/12 370/338 |
| 2018/0359764 A1* | 12/2018 | Ong | H04L 12/4625 |

OTHER PUBLICATIONS

Lux, "Lux/GEO WiFi Thermostat, Welcome to Your Lux/GEO Quick-Start Guide," 6 pages, 2016.
Vokas, "Connecting Devices to the Internet of Things with Wi-Fi," Embedded Computing Design, 6 pages, Jan. 5, 2015.

* cited by examiner

NETWORK CONNECTIVITY OF A BUILDING CONTROL DEVICE

TECHNICAL FIELD

The disclosure relates generally to building automation systems, and more particularly to building control devices for use in such building automation systems.

BACKGROUND

Building automation systems can include systems such as a Heating, Ventilation and/or Air Conditioning (HVAC) systems, security/access control systems, lighting systems, fire alarm and/or suppression systems and/or other building control systems. Many building automation systems include building control devices that activate and deactivate components of the building automation system to affect and control one or more conditions within the building. Many of these building control devices are connected to a network, such as a LAN and/or WAN. Such building control devices can often be monitored and/or controlled from a remote device that is also connected to the network.

The building control devices are typically provisioned with network credentials that allow the building control devices to connect to and access the network. The network credentials may include, for example, a network identifier (e.g. SSID) and a network password. In some cases, the network credentials, such as the network password, may be changed from time to time, such as to enhance security of the network. When such changes occur, the building control devices typically lose access to the network and go offline. This can affect the operation of the building automation system by, for example, preventing remote monitoring and/or control of the building control devices from a remote location. In any event, to reconnect each of the building control devices to the network, a user typically has to go to each building control device and update the network credentials or reconfigure the device. When there are multiple building control devices connected to the network, this can be a time consuming and tedious process.

In some cases, the network itself may become unavailable to a building control device. This can occur when, for example, the network host itself goes down, or in the case of a wireless network, the wireless signal at a particular building control device becomes weak preventing a reliable wireless connection. In some cases, there is a second network in the building, but the building control device typically cannot connect to the second network until a user goes to the building control device and updates the network credentials to correspond to the second network. When there are multiple building control devices that lose the network connection, this can be a time consuming and tedious process. Moreover, in order to update the network credentials, the user typically has to be physically present with access to the building control device.

What would be desirable are methods and system for enhancing network connectivity for building control devices of a building automation system.

SUMMARY

This disclosure relates generally to building automation systems, and more particularly to building control devices for such building automation systems. In one example, a building control device may include a wireless interface for wirelessly connecting the building control device to a network in a building, and a controller for providing one or more control signals for controlling one or more building control components of a building automation system of the building. The controller may be operatively coupled to the wireless interface and may be further configured to monitor when the wireless interface becomes disconnected from the network. When the wireless interface becomes disconnected from the network, the controller may attempt to reconnect the wireless interface to the network one or more times, and if successful, may return to monitoring, and if not successful, the controller may switch the wireless interface of the building control device into a configuration mode to establish a direct wireless connection with a remote device, receive one or more updated network credentials from the remote device while in the configuration mode, exit the configuration mode, and connect the wireless interface to the network or another network using the updated network credentials.

Alternatively or additionally to the foregoing, if the attempt to reconnect was not successful, the controller may be further configured to identify if the wireless interface became disconnected from the network because of a change in one or more network credentials, and if so, then and only then, the controller may switch the wireless interface of the building control device into the configuration mode to establish the direct wireless connection to the remote device, receive one or more updated network credentials from the remote device while in the configuration mode, and reconnect the wireless interface to the network using the updated network credentials.

Alternatively or additionally to any of the embodiments above, if the attempt to reconnect was not successful, the controller may be further configured to identify if the wireless interface became disconnected from the network because the network is no longer available, and if so, then the controller may switch the wireless interface of the building control device into the configuration mode to establish the direct wireless connection to the remote device, receive one or more updated network credentials from the remote device while in the configuration mode, and connect the wireless interface to another network using the updated network credentials.

Alternatively or additionally to any of the embodiments above, in the configuration mode, the direct wireless connection may be formed through a temporary network connection, with only the building control device and the remote device being members of the temporary network connection.

Alternatively or additionally to any of the embodiments above, in the temporary network connection may be hosted by the building control device.

Alternatively or additionally to any of the embodiments above, the configuration mode may comprise a WiFi hot spot mode.

Alternatively or additionally to any of the embodiments above, the one or more network credentials may comprise a passcode of a WiFi network and/or a Service Set Identifier (SSID) of a WiFi Network.

Alternatively or additionally to any of the embodiments above, in the configuration mode, the direct wireless connection may comprise a WiFi connection.

Alternatively or additionally to any of the embodiments above, in the configuration mode, the direct wireless connection may comprise a Bluetooth connection.

Alternatively or additionally to any of the embodiments above, the remote device may comprise a smartphone or tablet running an application program.

Alternatively or additionally to any of the embodiments above, one or more of the updated network credentials may be entered by a user via a user interface established by the application program.

In another example, a mobile device may comprise a wireless interface for wirelessly connecting the mobile device to a network that may have one or more building automation devices connected to the network and a controller operatively coupled to the wireless interface. The controller may be configured to identify when one or more network credentials of the network have changed, and when one or more network credentials of the network have changed, the controller may be configured to automatically establish communication with each of one or more of the building automation devices, send one or more updated network credentials directly to each of one or more of the building automation devices, such that one or more of the building automation devices can reconnect with the network using the one or more updated network credentials.

Alternatively or additionally to any of the embodiments above, the one or more network credentials may comprise a passcode of a WiFi network and/or a Service Set Identifier (SSID) of a WiFi Network.

Alternatively or additionally to any of the embodiments above, communication may be established with one of the building automation devices via a temporary WiFi connection, with the temporary WiFi connection hosted by the one of the building automation devices.

Alternatively or additionally to any of the embodiments above, communication may be sequentially established with each of two or more of the building automation devices via two or more temporary connections, with each temporary connection may be hosted by the building automation device with which the communication is established.

Alternatively or additionally to any of the embodiments above, communication may be established via a WiFi connection or a Bluetooth connection.

Alternatively or additionally to any of the embodiments above, the one or more building automation devices may comprise a thermostat.

Alternatively or additionally to any of the embodiments above, the mobile device may comprise a smartphone or tablet running an application program.

In another embodiment, a building control device may comprise a wireless interface for wirelessly connecting the building control device to two or more networks in a building, a memory for storing network credentials for each of two or more networks in the building, and a controller for providing one or more control signals for controlling one or more building control components of a building automation system of the building. The controller may be operatively coupled to the wireless interface and the memory and may be configured to connect the wireless interface of the building control device to a first network using one or more of the network credentials stored in the memory for a first one of the two or more networks, monitor when the wireless interface becomes disconnected from the first network, and when the wireless interface becomes disconnected from the first network, and may automatically connect the wireless interface of the building control device to a second network using one or more of the network credentials stored in the memory for a second one of the two or more networks.

Alternatively or additionally to any of the embodiments above, the first network may be a WiFi network, and the second network is a WiFi network.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which.

Figure 1:
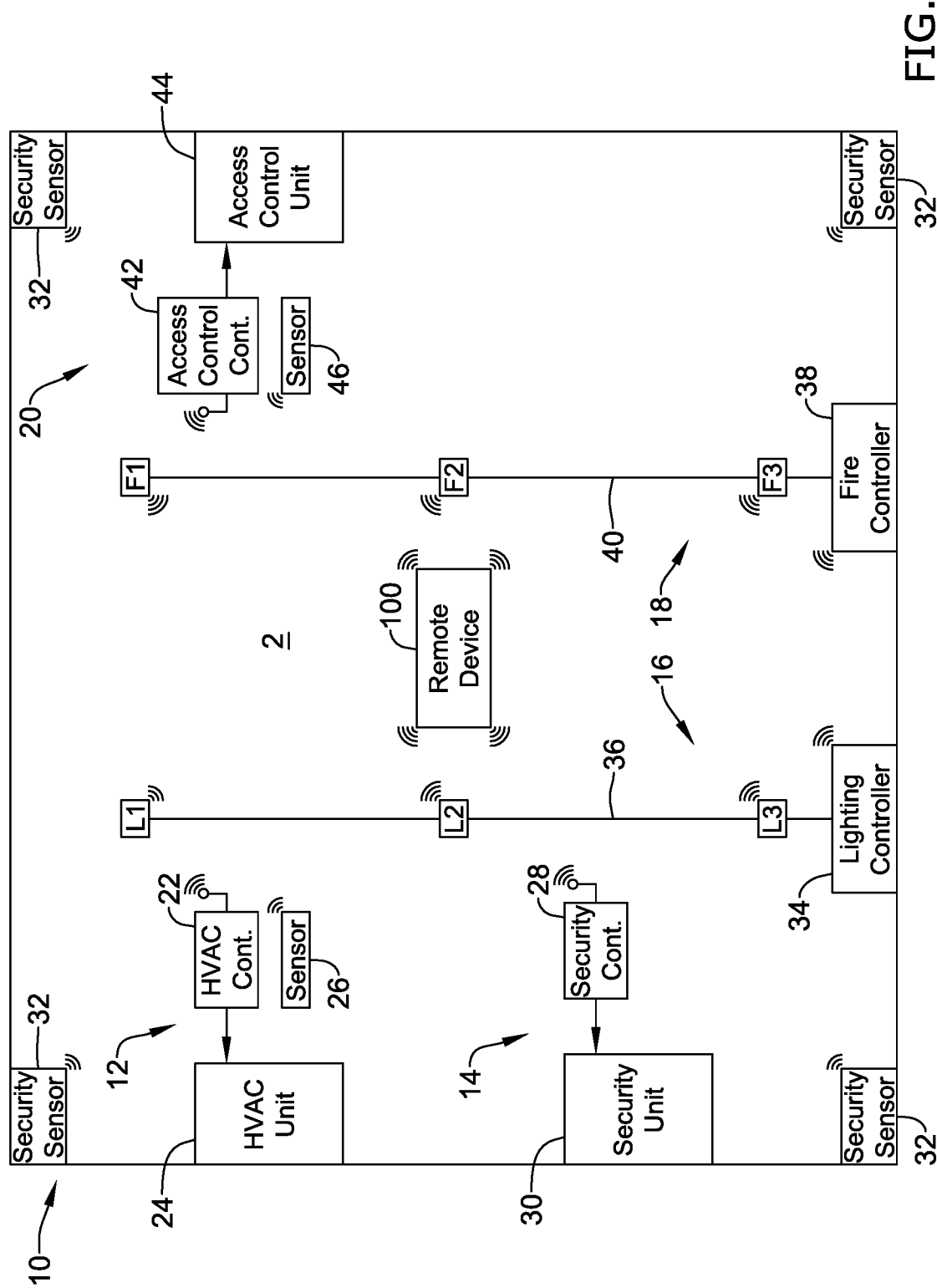
FIG. 1 is a schematic block diagram of an illustrative building automation system.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure. Although examples of construction, dimensions, and materials may be illustrated for the various elements, those skilled in the art will recognize that many of the examples provided have suitable alternatives that may be utilized.

FIG. 1 is a schematic view of a building or structure 10 that includes an illustrative building automation system 2 for controlling one or more building control components servicing the building or structure 10. The building automation system 2, as described herein according to the various illustrative embodiments, may be used to control environmental conditions, lighting conditions, security settings, fire/smoke monitoring, and/or access settings in buildings such as, for example, retail stores, commercial offices, hospitals, clinics, restaurants, single family dwellings, hotels, multi-tenant buildings, and/or multi-use facilities. These are just some examples. It will be generally understood that the building automation system 2 may be expanded and adapted to control and manage other systems and building control components, and may be deployed on a larger scale as the need arises. In addition, the building automation system 2, as described herein, may provide a wireless retrofit solution for facilities employing older building control components that may be wired and that are currently incapable of receiving a wireless or digital command signal. For example, the building automation system 2 may be configured to coordinate operational control of multiple building control components servicing the building or structure 10 that otherwise operate independently of one another. This may increase operational efficiency, reduce operational costs and/or maximize energy efficiency of the building or structure 10 in which the building automation system 2 is deployed.

The illustrative building automation system 2 shown in FIG. 1 includes one or more heating, ventilation, and air condition (HVAC) systems 12, one or more security systems 14, one or more lighting systems 16, one or more fire systems 18, and one or more access control systems 20. In some cases, each system may include a building control device configured to provide one or more control signals for controlling one or more building control components of the building automation system 2. For instance, in some cases, the HVAC system 12 may include an HVAC controller 22 used to communicate with and control one or more HVAC units 24 for servicing the building or structure 10. In some cases, the security system 14 may include a security controller 28 used to communicate with and control one or more security units 30 for monitoring the building or structure 10. In some cases, the lighting system 16 may include a lighting controller 34 used to communicate with and control one or more light banks 36 having lighting units L1, L2, and L3 for servicing the building or structure 10. In some cases, the fire system 18 may include a fire controller 38 used to communicate with and control one or more fire banks 40 having fire units F1, F2, and F3 for monitoring and servicing the building or structure 10. In some cases, the access control system may include an access control controller 42 used to communicate with and control one or more access control units 44 for allowing access in, out, and/or around the building or structure 10.

In a simplified example, the building automation system 2 may be used to control a single HVAC system 12, a single security system 14, a single lighting system 16, a single fire system 18, and/or a single access control system 20. In other embodiments, the building automation system 2 may be used to communicate with and control multiple discrete building control devices 22, 28, 34, 38, and 42 of multiple systems 12, 14, 16, 18 and 20. The discrete controllers 22, 28, 34, 38, and 42 may be located in different zones or rooms of the building and may be mounted, for example, on a wall, ceiling, or window of the building or structure 10. In some cases, the systems 12, 14, 16, 18, and 20 may be powered by line voltage, and may be powered by the same or different electrical circuit. While FIG. 1 shows controllers 22, 28, 42 controlling three units 24, 30, 44, a lighting controller 34 for controlling lighting bank 36 having three lighting units L1, L2, and L3, and a fire controller 38 for controlling fire bank 40 having three fire units F1, F2, and F3, it is contemplated that the building automation system 2 may be used to control other suitable building control components that may be used to service the building or structure 10.

According to various embodiments, the building automation system 10 may include a remote device 100 that may be configured to communicate with the discrete systems 12, 14, 16, 18, and 20 of the building automation system 2 and provide one or more control signals for controlling the building automation system 2. In some cases, the remote device 100 may be configured with an application program that connects the discrete systems 12, 14, 16, 18, and 20 to a network (not shown in FIG. 1). For instance, in some instances, the remote device 100 may send network credentials to the building control devices 22, 28, 34, 38, and 42 of each system. The building control devices 22, 28, 34, 38, and 42 may then use the network credentials to connect to a building network.

Alternatively, or in addition, the remote device 100 may be configured to control the systems 12, 14, 16, 18, and 20 in one or more rooms and/or zones of the building or structure by activating and/or deactivating the building control devices 22, 28, 34, 38, and 42 to operate the systems in a controlled manner. In some cases, the remote device 100 may be configured to transmit a command over a wired or wireless network to one or more of the building control devices 22, 28, 34, 38, and 42. In some cases, each building control device may be located near or in close proximity to the building control components that it controls. The building control devices 22, 28, 34, 38, and 42 may be configured to transmit a command signal to its corresponding building control component(s) for activating or deactivating the building control component(s) in a desired manner. In some cases, the building control devices 22, 28, 34, 38, and 42 may be configured to receive a command from the remote device 100 in a first signal format, and may transmit a corresponding command signal to their respective building control component(s) in a second signal format that their respective building control component(s) are configured to receive. In many cases, the first signal format transmitted by the remote device 100 is different from the second signal format received by the units, but this is not required.

In some instances, the building control devices 22, 28, and 42 may be configured to receive signals from one or more sensors 26, 32, and 46 located throughout the building or structure 10. In some cases, the building control devices 34 and 38 may be configured to receive signals from one or more sensors operatively and/or communicatively coupled with the lighting units L1, L2, and L3 and/or the fire units F1, F2, and F3 located throughout the building or structure 10. In some cases, the one or more sensors may be integrated with and form a part of one or more of their respective building control devices 22, 28, 34, 38, and 42. In other cases, one or more sensors may be provided as separate components from the corresponding building control device. In still other instances, some sensors may be separate components of their corresponding building control devices while others may be integrated with their corresponding building control device. These are just some examples. The building control devices 22, 28, 34, 38, 42 and the remote device 100 may be configured to use signal(s) received from the one or more sensors to operate or coordinate operation of the various building automation systems 12, 14, 16, 18, and 20 located throughout the building or structure 10.

The one or more sensors 26, 32, 46, L1-L3, and F1-F3 may be any one of a temperature sensor, a humidity sensor, an occupancy sensor, a light sensor, a current sensor, smoke sensor and/or any other suitable sensor. In one example, at least one of the sensors 26, 32, 46, or L1-L3 may be an occupancy sensor. The building control devices 22, 28, 34, 42 and/or the remote device 100 may receive a signal from the occupancy sensor indicative of occupancy within a room or zone of the building or structure 10. In response, the building control devices 22, 28, 34, 42 and/or the remote device 100 may send a command to activate one or more building control component(s) located in or servicing the room or zone where occupancy is sensed.

Likewise, in some cases, at least one of the sensors 26 may be a temperature sensor configured to send a signal indicative of the current temperature in a room or zone of the building or structure 10. The building control device 22 and/or the remote device 100 may receive the signal indicative of the current temperature from the temperature sensor 26. In response, the building control device 22 and/or the remote device 100 may send a command to HVAC unit 24 to activate and/or deactivate the HVAC 24 that is in or is servicing that room or zone to regulate the temperature in accordance with a desired temperature set point.

In yet another example, one or more of the sensors may be a current sensor. The current sensor may be coupled to the one or more building control components and/or an electrical circuit providing electrical power to one or more building control components. The current sensors may be configured to send a signal to a corresponding building control device and/or the remote device 100 that indicate an increase or decrease in electrical current associated with the operation of the building control component. This signal may be used to provide confirmation that a command transmitted by a building control device and/or the remote device 100 has been successfully received and acted upon by the building control component(s).

In some cases, the building control devices 22, 28, 34, 38, and 42 and/or the remote device 100 may operate the systems 12, 14, 16, 18, 20 located throughout the building or structure 10 in accordance with a programmable operating schedule. In some cases, the programmable operating schedule may include two or more time periods for each of two or more days. In some cases, the programmable operating schedule may be based on the level of occupancy in the building or structure 10 during those two or more time periods. These are just some examples.

Figure 2:
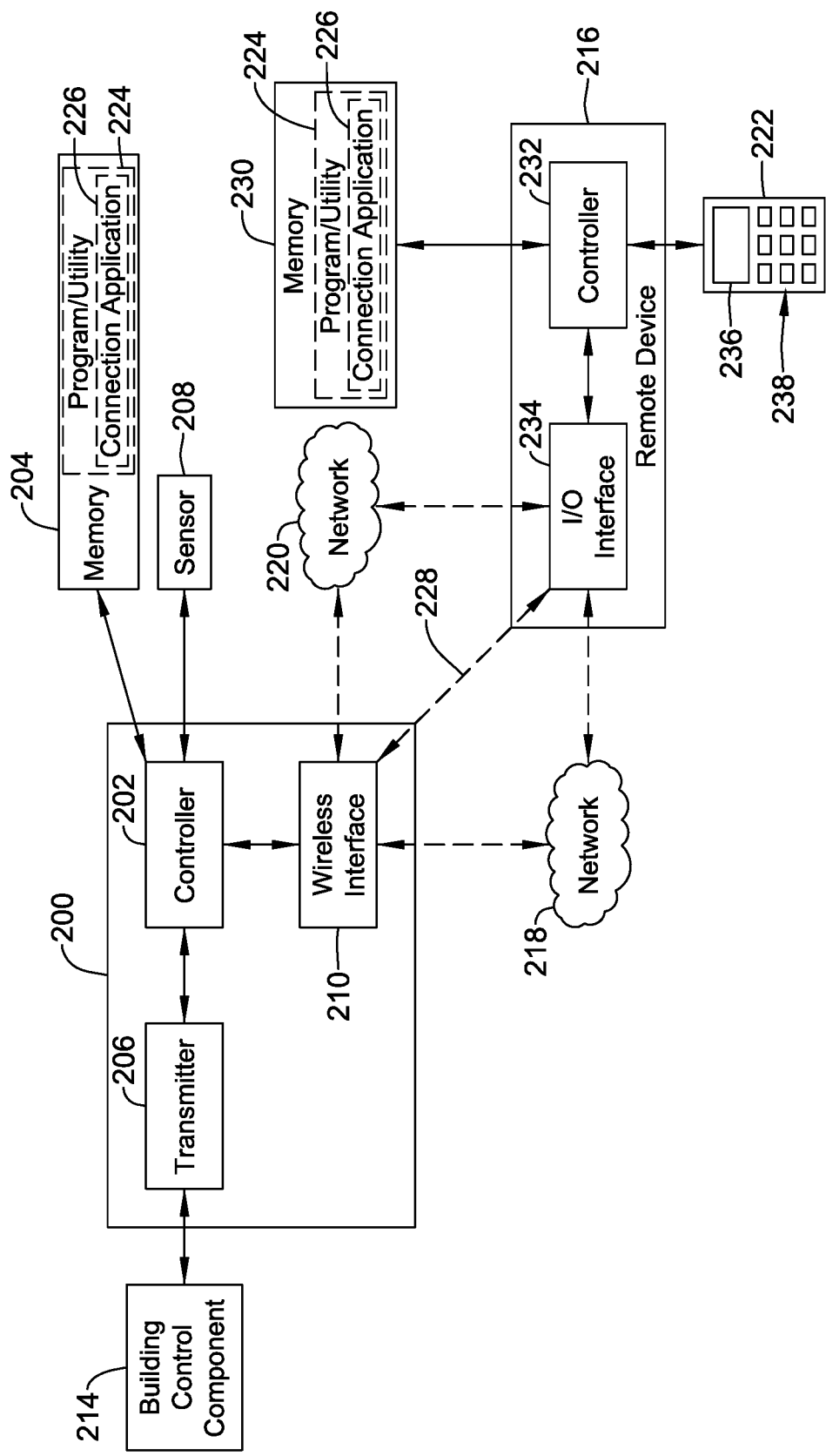
FIG. 2 is a schematic block diagram of an illustrative building control device.

FIG. 2 is a schematic block diagram of an illustrative building control device 200, which may be the same or similar to the building control devices 22, 28, 34, 38, and 42 of FIG. 1. In the example shown, the building control device 200 includes a controller 202 (e.g., microcontroller, microprocessor, etc.) operatively coupled to a memory 204, a transmitter 206 (sometimes a transceiver), a sensor(s) 208 (e.g., temperature sensors, humidity sensors, occupancy sensors, light sensors, current sensors, smoke sensors, etc.), and a wireless interface 210. The memory 204 and/or sensor(s) 208 may be located in a housing 212 of the building control device 200 and/or located remotely from the building control device 200.

The transmitter 206 may be configured to communicate using one or more wireless communication protocols, such as cellular communication, ZigBee, REDLINK™, Bluetooth, Wi-Fi, IrDA, infra-red (IR), dedicated short range communication (DSRC), EnOcean, radio frequency (RF) signals and/or any other suitable common or proprietary wireless protocol, as desired. In some cases, the transmitter 206 may communicate commands from the building control device 200 to a remotely located building control component 214 (e.g., HVAC unit, security unit, lighting unit, fire unit, access control unit, etc.). In certain embodiments, the building control component 214 or an onboard controller of the building control component 214 may include a receiver, and the transmitter 206 may transmit control commands to the building control component 214, which are then carried out by the building control component 214. For example, in certain embodiments, the transmitter 206 of the building control device 200 may communicate commands with an HVAC unit 214 using any suitable communication protocol, such as the BACnet protocol. In some cases, the transmitter 206 may communicate with a security unit 214 using any suitable communication protocol, such as the DC-09 protocol. In some cases, the transmitter 206 may communicate with a fire unit 214 using any suitable communication protocol, such as the Modbus protocol. In some cases, the transmitter 206 may communicate with an access control unit 214 using any suitable communication protocol, such as the EnOcean protocol. In some cases, the transmitter 206 may communicate with a lighting unit using any suitable communication protocol, such as the DALI protocol. These are just examples of building control network protocols that may be used to facilitate communication between the building control device 200 and discrete building control components (e.g., the unit 214). Other building control communication protocols may include, 1-Wire, C-Bus, CC-Link Industrial Networks, DSI, Dynet, KNX, LonTalk, oBIX, VSCP, xAP, X10, Z-Wave, INSTEON, TCIP, Ethernet, and/or any other suitable communication scheme. It is contemplated that the communication may be uni-directional or bi-directional, as desired.

In some cases, the building control component 214 may include its own sensors (e.g., temperature sensors, humidity sensors, occupancy sensors, light sensors, current sensors, smoke sensors, etc.). The building control component 214 may be configured to monitor and control the settings and conditions in a space based on the sensed parameters sensed by its own sensors.

In some instances, the controller 202 of the building control device 200 may include a pre-programmed chip, such as a very-large-scale integration (VLSI) chip and/or an application specific integrated circuit (ASIC). In such embodiments, the chip may be pre-programmed with control logic in order to control the operation of the building control device 200. In some cases, the pre-programmed chip may implement a state machine that performs the desired functions. By using a pre-programmed chip, the controller 202 may use less power than other programmable circuits (e.g. general purpose programmable microprocessors) while still being able to maintain basic functionality. In other instances, the controller 202 may include a programmable microprocessor. Such a programmable microprocessor may allow a user to modify the control logic of the building control device 200 even after it is installed in the field (e.g. firmware update), which may allow for greater flexibility of the building control device 200 in the field over using a pre-programmed ASIC.

According to various embodiments, the wireless interface 210 of the building control device 200 may permit the building control device 200 to communicate over one or more wireless networks, such as network 218 and/or network 220, for example. In some cases, the wireless interface 210 may utilize a wireless protocol to communicate with a remote device 216 over network 218 and/or network 220. In some cases, networks 218 and 220 may include a Local Area Networks (LAN) such as a Wi-Fi network and/or a Wide Area Networks (WAN) such as the Internet and/or a cellular network. These are just some examples.

In various embodiments, the memory 204 of the building control device 200 may be operatively coupled to the controller 202 and may be used to store any desired information, such as the aforementioned application program, network credentials, setpoints, IR codes, an IR database, schedule times, zones and groupings of building control components (e.g., unit 214), and the like. The memory 204 may be any suitable type of storage device including, but not limited to, RAM, ROM, EPROM, flash memory (e.g., NAND flash memory), an external SPI flash memory, a hard drive, and/or the like. In some cases, the memory 204 may include two or more types of memory. For example, the memory 204 may include a RAM, a ROM and a flash memory module.

During operation, the controller 202 may store information within the memory 204, and may subsequently retrieve the stored information from the memory 204. In some cases, program/utility 224 may be stored in the memory 204 and may include a set of application program modules (e.g. software), such as a connection application 226. In some cases, the program/utility 224 may include additional program modules as well as an operating system, one or more other application program modules, and/or program data. According to various embodiments, the application program modules (e.g., the connection application 226) may include network credentials, for example. In certain embodiments, the connection application 226, including the network credentials, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The connection application 226 may execute on the building control device 200. In some cases, the connection application 226 may execute on a remote device (e.g., remote device 216). In some cases, part of the connection application 226 may be executed on the building control device 200 and part of the connection application 226 may be executed on the remote device 216. In the latter scenario, the remote device 216 may be connected to the wireless interface 210 of the building control device 200 through any type of network (e.g., network 218 and 220). For instance, network 218 and 220 may be a local area network (LAN) or a wide area network (WAN), or the connection may be made to an external computer via a router (for example, through the Internet using an Internet Service Provider). In some cases, the connection application 226 may provide instructions to the controller 202 to switch the wireless interface 210 into a configuration mode to establish a direct wireless connection (e.g., a WiFi connection, a Bluetooth connection, a RF connection, an IR connection, etc.) with the remote device 216, bypassing a wireless router or the like. In some cases, the direct wireless connection may be formed through a temporary network connection 228, with only the building control device 200 and the remote device 216 being members of the temporary network connection 228. For example, in certain embodiments, the wireless interface 210 may initially be connected to network 218 through a router, gateway or other device that functions as a network access point. In this example, the wireless interface 210 may lose connection with the network access point and become disconnected from network 218. The wireless interface 210 may become disconnected from the network 218 for any number of different reasons including, for example, a change in the network credentials of the network 218 (e.g. a change in SSID or network password of a WiFi network), a weakened or lost network signal causing the network 218 to be no longer reliably available to the wireless interface 210, the network host device of the network 218 (e.g. router or gateway) fails or otherwise becomes non-operational, and/or for a variety of other reasons.

In some cases, the connection application 226 may cause the controller 202 to monitor when the wireless interface 210 becomes disconnected from the network 218. When the controller 202 identifies that the wireless interface 210 has become disconnected from the network 218, the controller 202 may attempt to reconnect the wireless interface 210 to the network 218 one or more times. In some cases, this may be done to accommodate temporary outages of the network 218. If the wireless interface 210 is successfully reconnected to the network 218, the controller 202 may continue to use the network 218 and to continue to monitor.

When the wireless interface 210 is not able to be reconnected to the network 218 after a predetermined amount of time (e.g. 1 second, 10 seconds, 1 minute, 5 minutes, 30 minutes, 1 hour, 1 day, etc.), the controller 202 may switch the wireless interface 210 into a configuration mode to establish a direct wireless connection with the remote device 216. For instance, in the configuration mode, the wireless interface 210 may be configured to act as a network access point and/or simply act as a host for a wireless network. In some cases, when the wireless interface 210 is acting as a network access point, the wireless interface 210 is essentially a WiFi hot spot and hosts a temporary network connection 228. As such, the wireless interface 210 may establish a direct wireless connection with the remote device 216 via the temporary network connection 228. The temporary network connection 228 may be any suitable network connection, such as cellular communication, ZigBee, REDLINK™, Bluetooth, Wi-Fi, IrDA, infra-red (IR), dedicated short range communication (DSRC), EnOcean, radio frequency (RF) signals and/or any other suitable common or proprietary wireless protocol.

In some instances, the remote device 216 may recognize when the wireless interface 210 is disconnected or leaves network 218. When so provided, the remote device 216 may monitor for and then automatically discover the temporary network connection 228. Furthermore, even though the remote device 216 may already be connected to network 218, the remote device 216 may proceed to gain access to the temporary network connection 228. In some cases, for the remote device 216 to gain access to the temporary network connection 228, the remote device 216 may need network appropriate credentials (e.g., a passcode) for the temporary network connection 228. In some cases, the building control device 200 may have a prefabricated media access control identifier (MAC ID) that is used as the SSID of the temporary network connection 228. The temporary network connection 228 may or may not have a passcode. If the temporary network connection 228 is protected by a passcode, the passcode can be a default value (e.g. admin), the MAC ID of the building control device 200 or any other suitable value.

In some embodiments, the remote device 216 may be configured with the MAC ID of several controllers of the building automation system, including the building control device 200. For example, the MAC ID for the building control device 200 may be stored in a memory 230 of the remote device 216. The remote device 216 may use the MAC ID to gain access to the temporary network connection 228 and establish the direct connection to the wireless interface 210 of the building control device 200 over the temporary network connection 228, either as the SSID and/or the passcode of the temporary network connection 228.

In various embodiments, the remote device 216 may be connectable to the network 218 (e.g. Wifi network) and the temporary network connection 228. In this case, the remote device 216 may monitor the network 218 and identify when the building control device 200 loses connection to the network 218. The remote device 216 may determine that the wireless interface 210 of the building control device 200 needs updated network credentials (e.g., a passcode) to gain or re-gain access to the network 218. As stated above, in some cases, the network credentials of the network 218 may have been changed or updated, sometimes using the remote device 216. The remote device 216 may obtain the updated network credentials for the network 218 (e.g., obtain the network credentials from a user of the remote device 216). In some cases, the remote device 216 may have previously obtained the updated network credentials for the network 218 from a user when the user connected or re-connected the remote device 216 to the network 218 using the updated network credentials. Regardless of how the updated network credentials were obtained by the remote device, once a direct connection is established between the remote device 216 and the wireless interface 210 of the building control device 200 via the temporary network connection 228, the remote device may provide the updated network credentials to the wireless interface 210 over the temporary network connection 228. In some cases, after the remote device 216 has sent the updated network credentials to the wireless interface 210 of the building control device 200, the remote device 216 may stay connected to the temporary network connection 228 and wait to receive an acknowledgement that the information was received by the wireless interface 210. The building control device 200 may be configured to then terminate the temporary network connection 228 and attempt to connect to the network 218 using the updated network credentials. The remote device 216 may disconnect or be disconnected from the temporary network connection 228 and may connect or re-connect to the network and verify that the remote device 216 has successfully connected to the network 218.

More specifically, and in some instances, once the wireless interface 210 of the building control device 200 has received the updated network credentials, the controller 202 may attempt to reconnect to the network 218 using the updated network credentials. In some cases, the controller 202 may first switch or exit the wireless interface 210 out of the configuration mode, shutting down the temporary network connection 228 and disconnecting from the remote device 216. The controller 202 may then use the wireless interface 210 to provide the updated network credentials to the device functioning as the network access point (e.g. WiFi router or gateway) for the network 218. If the updated network credentials are accepted, the wireless interface 210 may reconnect the building control device 200 to the network 218. In some cases, the controller 202 of the building control device may send confirmation to the remote device 216 that the wireless interface 210 is reconnected to the network 218. In some cases, the controller 202 may send the confirmation to the remote device 216 over the network 218. In some cases, the remote device 216 may identify the MAC ID of the building control device 200 on the network 218.

If the updated network credentials were not accepted by the network access point (e.g. WiFi router or gateway) for the network 218, the wireless interface 210 of the building control device 200 may not be able to reconnect to network 218. The controller 202 may then reestablish the temporary network connection 228 to notify the remote device 216 that reconnection has failed. The user of the remote device 216 may then be prompted to enter the correct network credentials.

In another example, the wireless interface 210 of the building control device 200 may initially be connected to network 218. In this example, if or when the wireless interface 210 becomes disconnected from network 218 and the controller 202 has tried unsuccessfully to reconnect the wireless interface 210 to network 218, the connection application 226 of the building control device 200 may provide instructions to the controller 202 to monitor and/or discover other available networks (e.g., network 220). Once the controller 202 discovers another available network, such as network 220, the controller 202 may provide network credentials (e.g., passcodes) for a router or gateway functioning as a network access point for network 220 and automatically connect to the network 220. In some instances, the controller 202 may store network credentials for two or more networks in the memory 204 so that the building control device 200 can automatically switch between the two or more networks (e.g. between network 218 and 220) to help improve the reliability of the network connection of the building control device 200.

According to certain embodiments, the remote device 216 may include a user interface 222, an I/O interface 234, a controller 232, and the memory 230. In some cases, the user interface 222 may permit the remote device 216 to display and/or solicit information, such as network credentials (e.g., passcodes, SSID's, MAC ID's, etc.), from a user, as well as accept one or more user interactions with the remote device 216. Through the user interface 222, the user may, for example, view and manage the network connections of one or more building control devices (e.g., the building control device 200) of a building automation system (e.g., the building automation system 2, from FIG. 1). When provided, the ability to view and manage multiple network connections of several building control devices may facilitate improved management of a building, house, or other structure. In some cases, the remote device 216 may be a smart phone, a tablet computer, a laptop computer, a desktop computer and/or any other suitable device, and the user interface 222 may be a physical user interface that may include a display 236 and/or a distinct keypad 238. The display 236 may be any suitable display. In some instances, the display 236 may include or may be a liquid crystal display (LCD), an OLED, etc., and in some cases a fixed segment display, a dot matrix LCD display, a 7-segment type display, and/or may include one or more LEDs. In some cases, the display 236 may include a touch screen LCD panel that functions as both the display 236 and the keypad 238. In some cases, the user interface 222 may be adapted to solicit network credentials, but this is not required.

In some instances, the I/O interface 234 of the remote device 216 may be configured similar to the wireless interface 210 of the building control device 200 and permit the remote device 216 to communicate over the one or more wireless networks 218, 220, and/or the temporary network connection 228. In some cases, the I/O interface 234 may be configured to communicate with two or more controllers (e.g., the controllers 22, 28, 34, 38, and 42 of FIG. 1), including the building control device 200, for example. As shown in FIG. 2, the remote device 216 may include a controller 232 configured similar to the controller 202 of the building control device 200, and memory 230 configured similar to memory 204.

As discussed herein, in regard to the controller 202 and memory 204, memory 230 of the remote device 216 may be operatively coupled to the controller 232 and may be used to store any desired information. During operation, the controller 232 may store information within memory 230, and may retrieve the stored information from memory 230. In some cases, program/utility 224 may be stored in memory 230 and may include a set of application program modules (e.g. app), such as the connection application 226. According to various embodiments, the application program modules (e.g., the connection application 226) may include or reference network credentials, for example. The connection application 226 may be executed on the remote device 216 or part of the connection application 226 may be executed on the remote device 216.

In some instances, the wireless interface 210 may initially be connected to the network 218 hosted by a router or gateway that acts as a network access point. The wireless interface 210 may lose access to the network access point or gateway and become disconnected from network 218. This may occur for several reasons. For instance, the network 218 connection signals may become temporarily or permanently weakened by for example newly installed intervening structure, noise and/or other interference. Alternatively, the network 218 may simply become unavailable, such as when the router or gateway hosting the network 218 fails to function properly. When this occurs, the controller 232 may search and find the network 220, and may read up or otherwise obtain the network credentials (e.g., passcodes) for the network 220. The controller 232 may then use those network credentials to connect to the network 220. In some instances, the controller 232 may have already had the network credentials for network 220 stored in the memory 230. In some instances, the controller 232 may have received the network credentials for network 220 from a user via the user interface 222. In some instances, the controller 232 may automatically switch from network 218 to network 220, while in other cases the controller 232 may first request permission from the user (e.g. via the remote device 216) to switch networks.

The temporary network connection 228 may include one or more wireless communication protocols, such as cellular communication, ZigBee, REDLINK™, Bluetooth, Wi-Fi, IrDA, infra-red (IR), dedicated short range communication (DSRC), EnOcean, radio frequency (RF) signals and/or any other suitable common or proprietary wireless protocol. The controller 232 may use the I/O interface 234 of the remote device 216 to send the network credentials for network 220 to the wireless interface 210 of the building control device 200 over the temporary network connection 228. In some cases, once the controller 232 of the remote device 216 has sent the network credentials to the wireless interface 210, the controller 232 may disconnect the I/O interface 234 from the temporary network connection 228 and wait to receive confirmation over network 220 from the controller 202 that the wireless interface 210 has connected to the network 220. In some cases, when the controller 232 of the remote device 216 has sent the network credentials to the wireless interface 210, the controller 232 may keep the I/O interface 234 connected to the temporary network connection 228 and wait to receive confirmation from the controller 202 either over the temporary network connection 228 or the network 220 that the wireless interface 210 has connected to network 220.

In some instances, once the wireless interface 210 of the building control device 200 has received the network credentials for network 220, the controller 202 of the building control device 200 may use the wireless interface 210 to provide the network credentials to a router or the like functioning as the network access point for network 220. If the network credentials are deemed to be correct by the router, the wireless interface 210 may be allowed to connect to the network 220. In some cases, the controller 202 of the building control device 200 may then send confirmation to the controller 232 of the remote device 216 that the wireless interface 210 of the building control device 200 is successfully connected to the network 220. In some cases, the controller 202 of the building control device 200 may send the confirmation to the controller 232 over the network 220. In some cases, if the I/O interface has not disconnected from the temporary network connection 228, the controller 202 of the building control device 200 may send the confirmation to the controller 232 over the temporary network connection 228. If the network credentials are not correct, the wireless interface 210 may not be able to connect to network 220. The controller 202 of the building control device 200 may then notify the controller 232 of the remote device 216 over the temporary network connection 228 that the connection has failed or reestablish the temporary network connection 228 to notify the controller 232 of the remote device 216 that the connection has failed.

In some instances, the network credentials to the network 218 (e.g. WiFi passcode and or SSID) may be changed or updated. In some cases, the connection application 226 of the remote device 216 may facilitate control over the controller 232 of the remote device 216 to identify when the network credentials for network 218 have changed. In this example, once the controller 232 of the remote device 216 identifies that the network credentials have changed, the controller 232 may use the I/O interface 234 to automatically establish communication with the wireless interface 210 of the building control device 200 via a temporary network connection 228 and provide the updated network credentials for network 218 to the building control device 200. The building control device 200 may then use the updated network credentials to connect or reconnect to the network 218.

In some cases, the controller 232 may receive the updated network credentials from a user of the remote device 216 via the user interface 222 of the remote device 216. In various embodiments, the connection application 226 may facilitate control over the controller 232 by providing instructions to the controller 232 to automatically provide the updated network credentials for network 218 to the building control device 200.

Figure 3A:
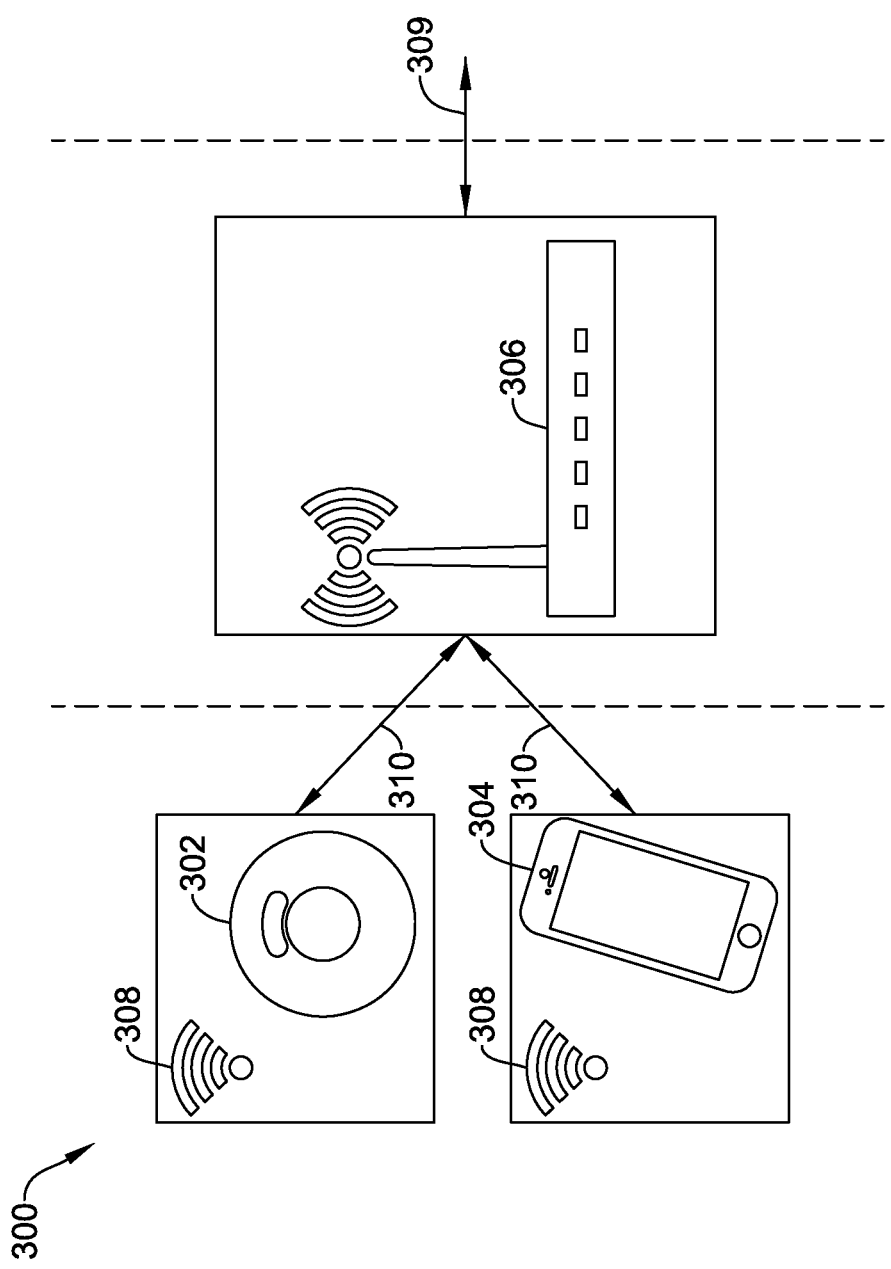
FIGS. 3A-3D are schematic views illustrating a method for reconnecting a building automation device to a network.
Figure 3B:
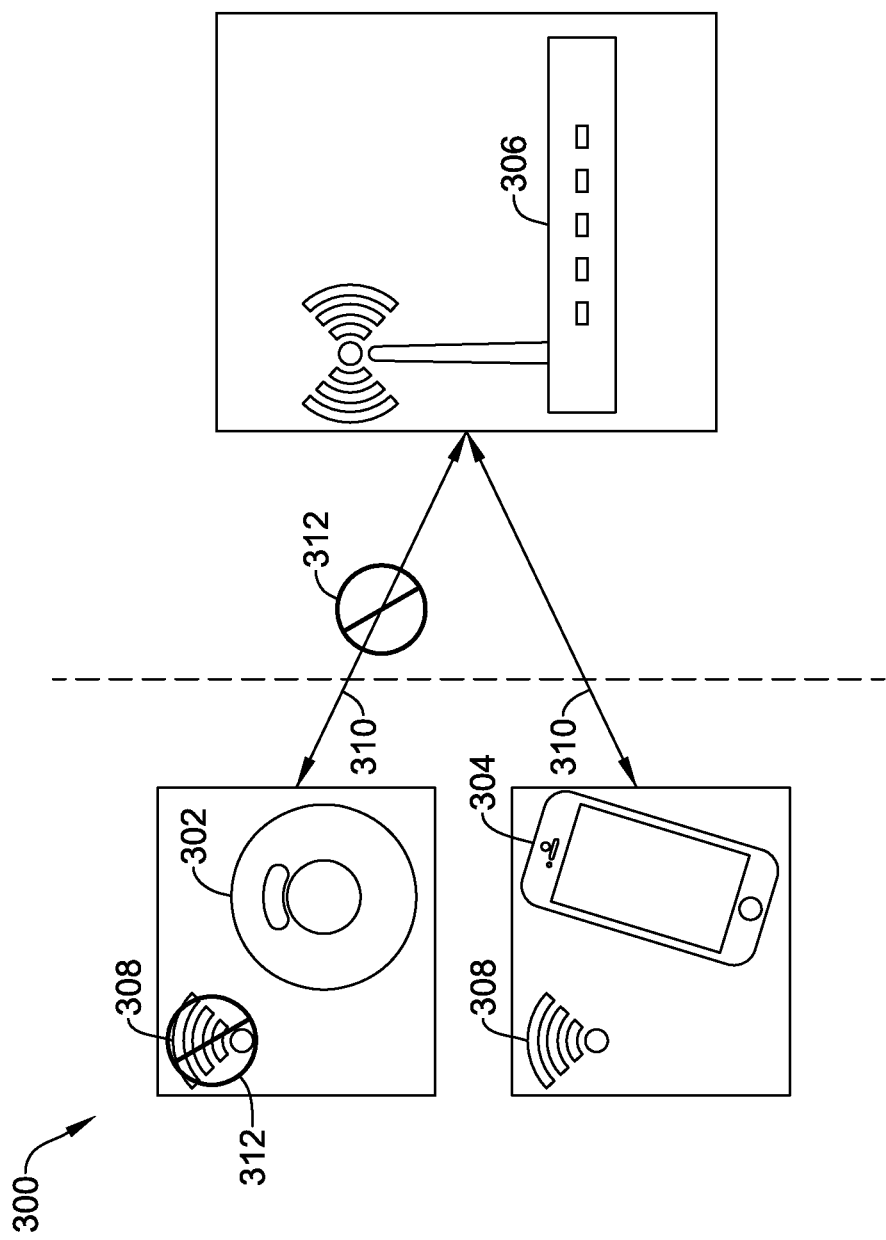

FIG. 3A-3D are illustrative views of a method 300 for reconnecting a building automation device, such as the building control device 200 from FIG. 2, to a network 310. As shown in FIG. 3A, the building automation device may be a thermostat 302 and may initially be connected (as indicated by connection indicator 308) through a router 306 that functions as a network access point for network 310. Although the thermostat 302 is shown, any building automation device may be used. The router may host the network 310 and in some cases may provide access to a LAN or WAN, such as the Internet 309. In this example, the mobile device 304 may be a smartphone or a tablet that is also connected to network 310 via the router 306. Turning to FIG. 3B, in some cases, the thermostat 302 may become disconnected from network 310, as indicated by disconnection indicator 312. In one example, the thermostat 302 may become disconnected from the network 310 because the network credentials, such as a passcode or an SSID for network 310, have been changed or updated. In this example, the network credentials are necessary for the thermostat 302 to remain connected to network 310.

Figure 3C:
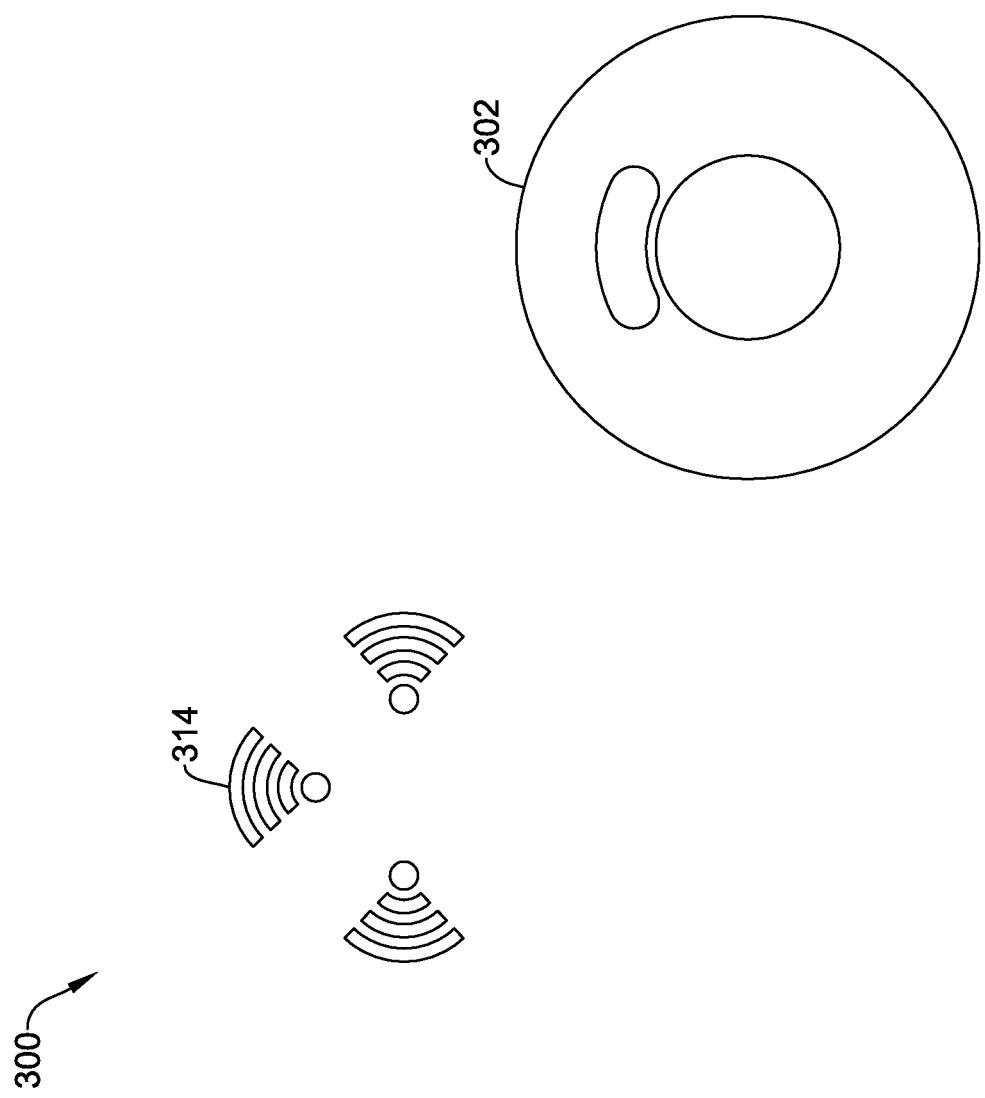

In some cases, an application program may be running on both the thermostat 302 and the mobile device 304. When the thermostat 302 becomes disconnected from network 310, the application program of the thermostat 302 may cause the thermostat 302 to attempt to reconnect to network 310, sometimes one or more times or for a predetermined amount of time (e.g. 1 second, 10 seconds, 1 minute, 5 minutes, 30 minutes, 1 hour, 1 day, etc.). If the wireless thermostat 302 successfully reconnects to the network 310, the thermostat 302 may operate as usual. However, as shown in FIG. 3C, if the thermostat 302 is not able to reconnect to network 310, the thermostat 302 may switch into a configuration mode to establish a direct wireless connection with a mobile device 304. For instance, in the configuration mode, the thermostat 302 may be configured to host a temporary network connection (e.g. act as a WiFi hotspot or an access point) as indicated by hot spot indicator 314. In some cases, when the thermostat 302 is hosting a temporary network connection 316 (shown in FIG. 3D), the thermostat 302 may be essentially functioning as a WiFi hot spot or any communication protocol. The mobile device 304 may then establish a direct wireless connection with the thermostat 302 via the temporary network connection 316.

In some instances, the mobile device 304 may recognize when the thermostat 302 is disconnected or leaves the network 316. Accordingly, the mobile device 304 may monitor for and discover the temporary network connection 316 hosted by the thermostat 302. Furthermore, even though the mobile device 304 may already be connected to network 310, as indicated by connection indicator 308, the mobile device 304 may proceed to gain access to the temporary network connection 316. In some cases, for the mobile device 304 to gain access to the temporary network connection 316, the mobile device 304 may first need to disconnect from the network 310. That is, some mobile devices 304 may only be able to connect to one wireless interface at a time.

In order to connect to the temporary network connection 316, the mobile device 304 may need network credentials (e.g., a passcode or SSID) for the temporary network connection 316. In some cases, the thermostat 302 may have a prefabricated MAC ID that the thermostat 302 uses as the SSID of the temporary network connection 316 hosted by the thermostat 302. The MAC ID may also be used as the passcode for the temporary network connection 316.

In some embodiments, the mobile device 304 may be configured with the MAC ID of several building control devices, including the thermostat 302. For example, the MAC IDs for the building control devices may be stored in a memory of the mobile device 304. In some instances, text can be added or linked to the specific user account of the mobile device 304. The mobile device 304 may then search for temporary network connections that have SSIDs that match one of the stored MAC IDs. The mobile device 304 may then sequentially connect to each of the temporary network connections (e.g. WiFi hotspots) with a matching SSID and provide the updated network credentials for the network 310. In some cases, the mobile device 304 may sequence through the various temporary network connections automatically and without further user input. This may be particularly useful when the network credentials of a network (e.g. WiFi network) are updated in a building that has a plurality of building control devices connected to the WiFi network. Each of the plurality of building control devices may detect that they can no longer connect to the WiFi network, and in response host a temporary network connection, sometimes using their MAC ID as the SSID of the temporary network connection. The updated network credentials may be supplied to the mobile device 304, and the mobile device 304 may then automatically find and connect to each of the temporary network connections and provide the updated network credentials. As they receive the updated network credentials, each of the plurality of building control devices may terminate their temporarily network connection and reconnect with the WiFi network using the updated network credentials.

Figure 3D:
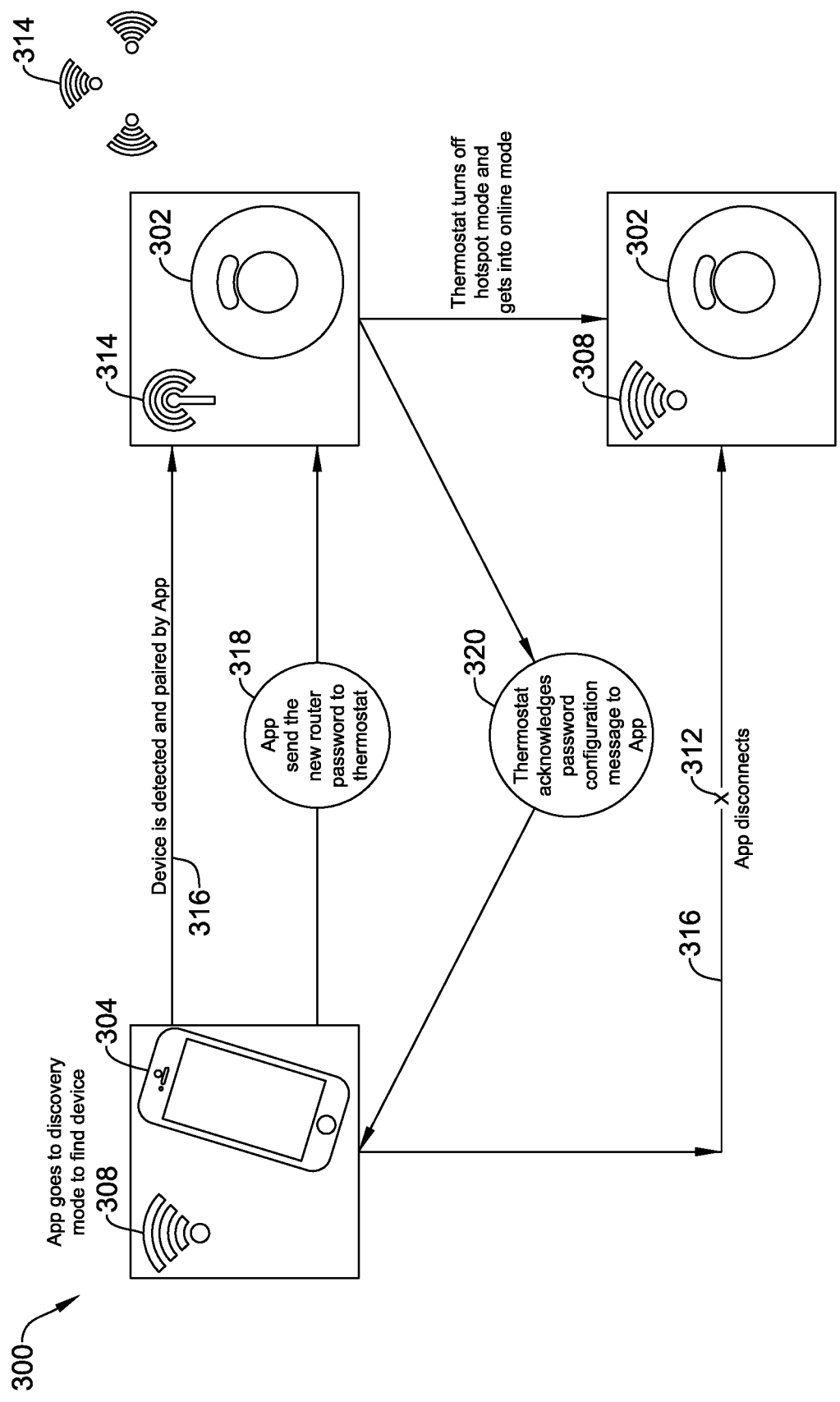

In FIG. 3D, the thermostat 302 has lost connection to the WiFi network of the building, and has entered a WiFi hotspot mode 314 to host a temporary network connection. In some cases, the SSID of the temporary network connection is set to the MAC ID of the thermostat 302. The mobile device 304 may go into a discovery mode 308 searching for available WiFi networks. The mobile device 304 may go into a discover mode 308 when, for example, commanded by the user of the mobile device 304 or when the mobile device 304 detects that the thermostat 302 has gone off-line from the WiFi network of the building. In some cases, the mobile device 304 may store the MAC ID of the thermostat 302 in memory, and may search for a WiFi network having an SSID that matches the MAC ID of the thermostat 302, but this is not required. Upon discovering the temporary network connection of the thermostat 302, the mobile device 304 may be paired with the thermostat 302 via the temporary network connection 316. Once paired, the mobile device 304 may send updated network credentials (e.g. password) for the WiFi network of the building to the thermostat 302 via the temporary network connection 316, as shown at 318. In some cases, the thermostat 302 may respond by sending an acknowledgement back to the mobile device 304 via the temporary network connection 316 as shown at 320, acknowledging receipt of the updated network credentials. The thermostat 302 may then terminate the WiFi hotspot mode 314 and attempt to reconnect to the WiFi network of the building using the updated network credentials.

According to various embodiments, the above exemplary method 300 of the mobile device 304 reconnecting a building automation device to a network, may involve multiple building automation devices each hosting their own temporary network connections (e.g., a Wifi hot spot). In some cases, communication may be sequentially established over each of the temporary network connections that correspond to the multiple building automation devices, in a manner similar to that described above.

Figure 4:
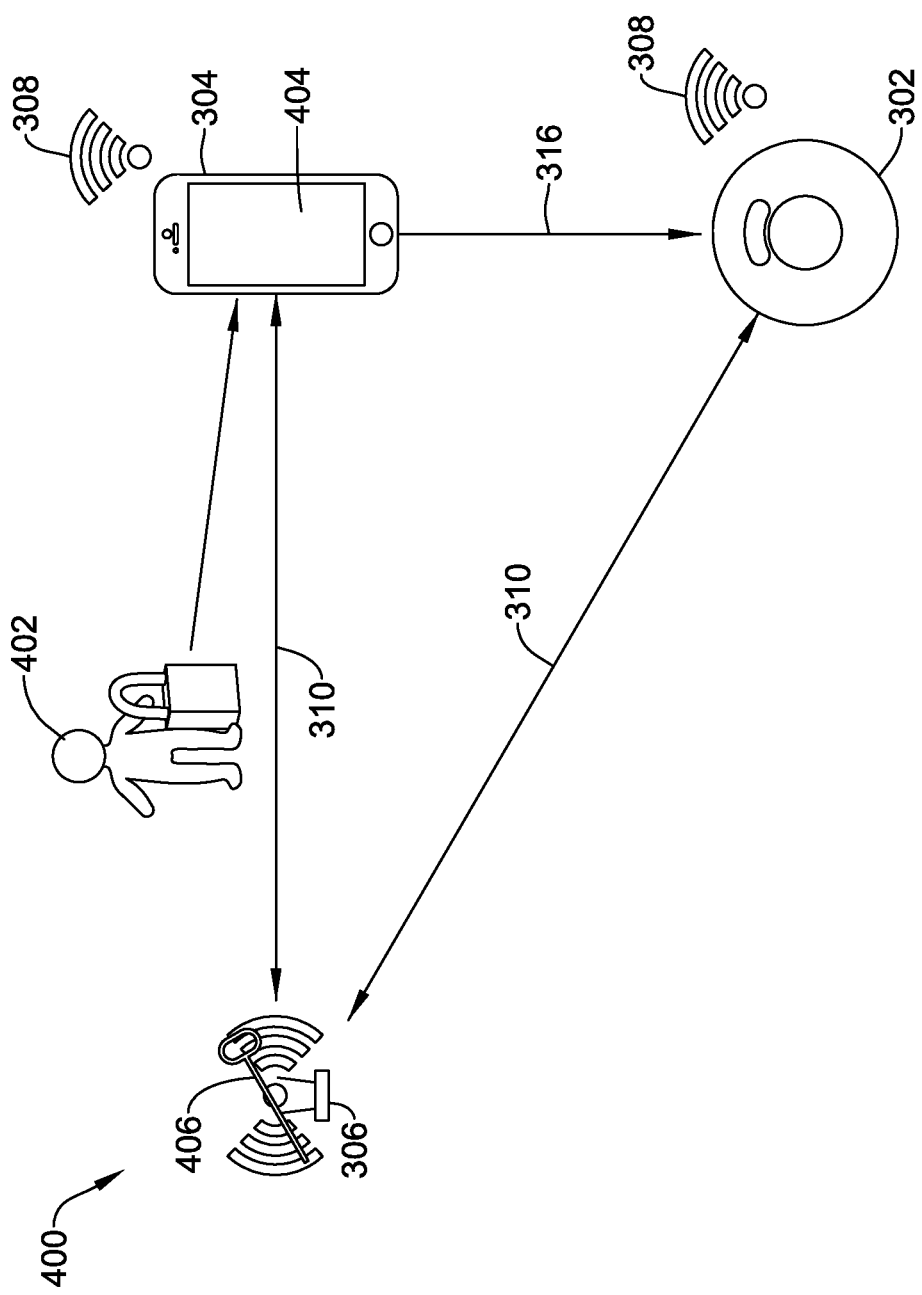
FIG. 4 is a schematic view of a method for reconnecting a building automation device to a network.

FIG. 4 is an illustrative view of another method 400 for using a mobile device 304 to reconnect the thermostat 302 to the network 310. As shown, the thermostat 302 and the mobile device 304 may initially be connected to a network 310 through a router 306. In this example, network credentials 406 for the network 310 (e.g. WiFi network) may be changed or updated, or the SSID to the network 310 may be changed or updated. In some cases, an application program running on the mobile device 304 may facilitate control over the mobile device 304 to identify when the network credentials 406 of the network 310 have changed. In this example, once the mobile device 304 identifies that the network credentials 406 have changed, the mobile device 304 may automatically establish communication with the thermostat 302, or any other building automation device. For instance, the mobile device 304 may establish communication via a temporary network connection 316 that is hosted by the thermostat 302. Once communication is established, the mobile device 304 may send the updated network credentials 406 to the thermostat 302. In some cases, as described in regard to method 300, once the mobile device 304 has sent the network credentials 406 to the thermostat 302, the mobile device 304 may disconnect from the temporary network connection 316 and wait to receive confirmation over network 310 from the thermostat 302 that the thermostat 302 has reconnected to network 310 using the updated network credentials. In some cases, after the mobile device has sent the network credentials 406 to the thermostat 302, the mobile device 304 may receive confirmation from the thermostat 302 that the thermostat 302 has received the updated network credentials 406 over the temporary network connection 316 before the temporary network connection 316 is terminated by the thermostat 302.

In some cases, the network credentials 406 of the network 310 may be initially changed or updated using the mobile device 304. When so provided, the mobile device 304 may expect that the building control devices in the building that were connected to the network 310 will go off-line and establish their own temporary network connection. The mobile device may then automatically go into discover mode and sequentially discover, connect and deliver the updated network credentials to each of the building control devices.

Figure 5A:
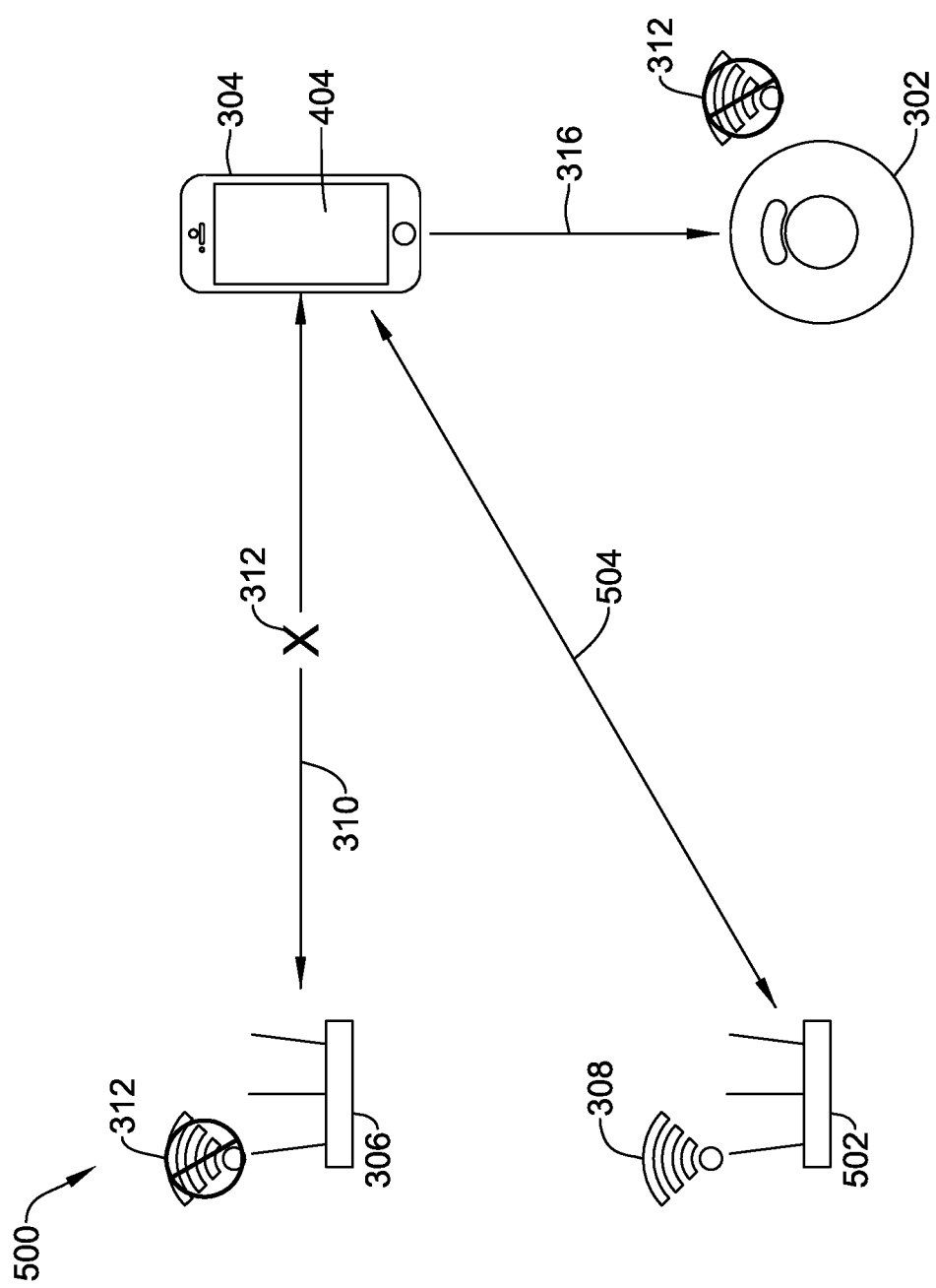
FIGS. 5A-5B are schematic views illustrating a method for connecting a building automation device to a second network.
Figure 5B:
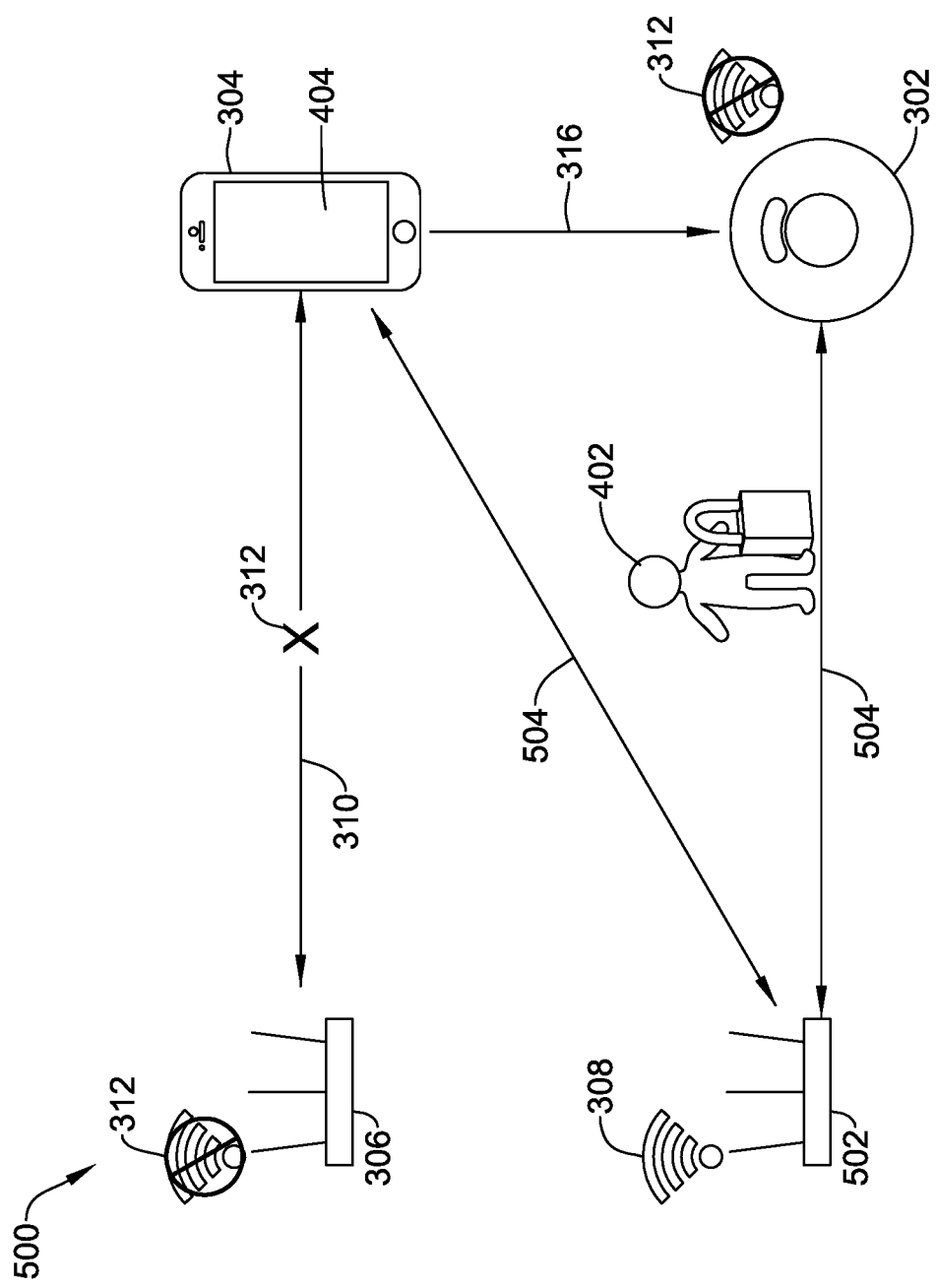

FIG. 5A-5B are illustrative views of another method 500 of using a mobile device 304 to connect the thermostat 302 to a second network 504. In this example, the thermostat 302 and the mobile device 304 may initially be connected to a first network 310 through a first router 306, as shown. The thermostat 302 may at some point lose access to the first router 306 and become disconnected from first network 310, as indicated by the disconnection indicators 312. In some cases, the thermostat 302 may become disconnected from the network 310 for any number of different reasons including, for example, a change in the network credentials of the network 310 (e.g. a change in SSID or network password of a WiFi network), a weakened or lost network signal causing the network 310 to be no longer reliably available to the thermostat 302, the first router 306 of the network 310 fails or otherwise becomes non-operational, and/or for a variety of other reasons.

In this case, the mobile device 304 may obtain network credentials for a second router 502 functioning as a network access point for a second network 504, and connect to second network 504. In some instances, the mobile device may pre-store the network credentials for the second network 504 (and the first network 310) in memory. In some instances, the mobile device 304 may receive the network credentials for the second network 504 from a user 402 (shown in FIG. 5B) via the user interface 404 of the mobile device 304. In some instances, the mobile device 304 may be configured to automatically obtain the network credentials from the second router 502 or another automated source. In any event, the mobile device 304 may provide the network credentials for the second router 502 to the thermostat 302 via a temporary network connection 316 hosted by the thermostat 302.

Figure 6:
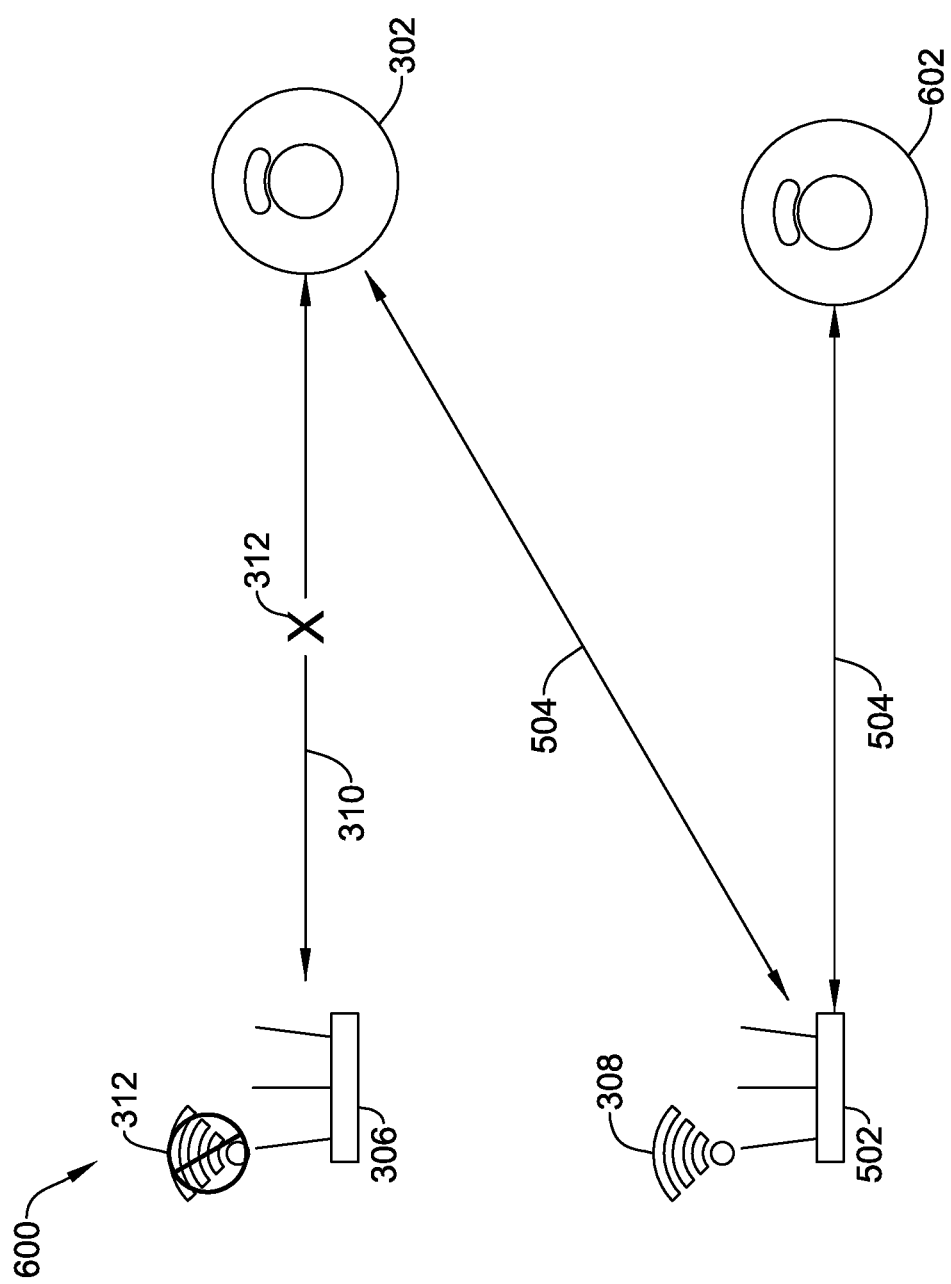
FIG. 6 is a schematic view of a method for automatically connecting a building automation device to a second network.

FIG. 6 is an illustrative view of a method 500 of the thermostat 302 automatically connecting to the second network 504 when the first network connection 312 fails. In this example, the thermostat 302 may be connected to a first network 310 hosted by a first router 306. In some cases, a thermostat 602 may be connected to a second network 504 hosted by a second router 502. The thermostat 302 may lose access to the first network 310, as indicated by disconnection indicator 312. When the thermostat 302 becomes disconnected from first network 312 and the thermostat 302 has tried unsuccessfully to reconnect to the first network 310, the thermostat 302 may be configured to automatically connect to the second network 504.

In some cases, after losing connection to the first network 310, the thermostat 302 may monitor and/or discover other available networks (e.g., second network 504). Once the thermostat 302 discovers second network 504, the thermostat 302 may obtain network credentials for the second network and automatically connect to the second network 504. In some instances, the thermostat 302 may store the network credentials for second network 504 in memory. In some instances, the thermostat 302 may have previously received the network credentials for the second network 504 from a user and stored the network credentials in memory. In some instances, the thermostat 302 may be configured to automatically obtain the network credentials from the second router 502 or another automated source (e.g., thermostat 602). In any event, the thermostat 302 may provide the network credentials to the second router 502 and connect to the second network 504. In some cases, the thermostat 302 may store network credentials for two or more networks, and may automatically switch to a network that has the highest signal to noise ratio, highest available bandwidth, and/or has some other desirable characteristic.

Figure 7:
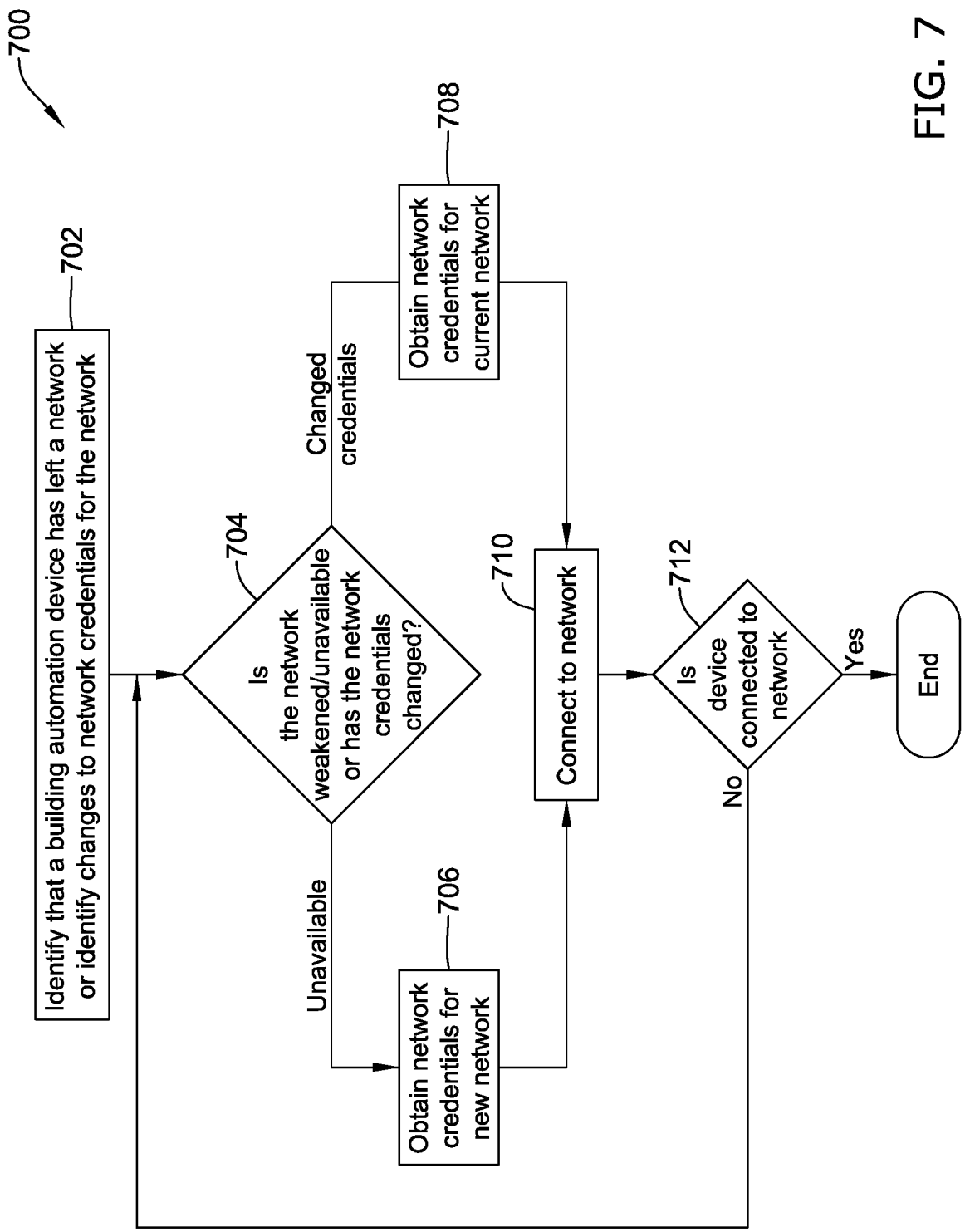
FIG. 7 is a flow diagram of an illustrative method for connecting a building automation device to a network.

FIG. 7 shows an illustrative method 700 for connecting one or more building automation devices to a network. The illustrative method 700 begins at step 702, where one or more building automation devices may be identified as having been disconnected from a network, or changes to network credentials for the network may be identified. In some examples, the building automation device may become disconnected from the network for any number of different reasons including, for example, a change in the network credentials of the network (e.g. a change in SSID or network password of a WiFi network), a weakened or lost network signal causing the network to be no longer reliably available, the network host device of the network (e.g. router or gateway) fails or otherwise becomes non-operational, and/or for a variety of other reasons. In some examples, changes to the network credentials may be changes in or an updated WiFi passcode of the network access point or a change in or an updated SSID passcode for the network.

In any event, at step 704, it may be determined whether the network is weakened/unavailable or whether the network credentials for the network have changed. If the network is weakened/unavailable, at step 706, new network credentials for a new network may be obtained. In some examples, the new network credentials may be obtained from a new network access point for the new network or from another automated device. In some examples, the new network credentials may be obtained from a user. If the network credentials have changed, at step 708, updated network credentials may be obtained for the current network. In some examples, the updated network credentials may be obtained from the network access point for the current network or from another automated device. In some examples, the updated network credentials may be obtained from a user.

At step 710, the building automation device may attempt to connect to the new network using the new network credentials or reconnect to the current network using the updated network credentials. At step 712, it may be determined whether the building automation device has successfully connected to the new network or the current network. If the building automation device has successfully connected to a network, method 700 may end. If the building automation device has not successfully connected to a network, at step 704, it may once again be determined whether the network is weakened/unavailable or whether the network credentials for the network have changed and method 700 may proceed in a similar fashion until the building automation device has successfully connected to a network.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Also, in the above Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description as examples or embodiments, with each claim standing on its own as a separate embodiment, and it is contemplated that such embodiments can be combined with each other in various combinations or permutations.

What is claimed is:

1. A building control device comprising:
   a wireless interface for wirelessly connecting the building control device to a network in a building; and
   a controller comprising processing circuitry for providing one or more control signals for controlling one or more building control components of a building automation system of the building;
   the controller operatively coupled to the wireless interface, the controller further configured to monitor when the wireless interface becomes disconnected from the network, and when the wireless interface becomes disconnected from the network:
      attempt to reconnect the wireless interface to the network one or more times, and if successful, return to monitor when the wireless interface becomes disconnected from the network, and if not successful:
      switch the wireless interface of the building control device into a configuration mode to establish a direct wireless connection with a remote device;
      receive one or more updated network credentials from the remote device while in the configuration mode;
      exit the configuration mode; and
      connect the wireless interface to the network or another network using the updated network credentials.

2. The building control device of claim 1, wherein if the attempt to reconnect was not successful, the controller is further configured to identify if the wireless interface became disconnected from the network because of a change in one or more network credentials, and if so, then and only then:
   switch the wireless interface of the building control device into the configuration mode to establish the direct wireless connection to the remote device;
   receive one or more updated network credentials from the remote device while in the configuration mode; and
   reconnect the wireless interface to the network using the updated network credentials.

3. The building control device of claim 1, wherein if the attempt to reconnect was not successful, the controller is further configured to identify if the wireless interface became disconnected from the network because the network is no longer available, and if so, then:
   switch the wireless interface of the building control device into the configuration mode to establish the direct wireless connection to the remote device;
   receive one or more updated network credentials from the remote device while in the configuration mode; and
   connect the wireless interface to another network using the updated network credentials.

4. The building control device of claim 1, wherein in the configuration mode, the direct wireless connection is formed through a temporary network connection, with only the building control device and the remote device being members of the temporary network connection.

5. The building control device of claim 4, wherein in the temporary network connection is hosted by the building control device.

6. The building control device of claim 1,
   wherein the configuration mode comprises a WiFi hot spot mode in which the building control device functions as a WiFi hot spot and hosts the temporary network connection, and
   wherein the building control device is configured to receive one or more updated network credentials from the remote device while functioning as the WiFi hot spot and while hosting the temporary network connection.

7. The building control device of claim 1, wherein the one or more network credentials comprises a passcode of a WiFi network and/or a Service Set Identifier (SSID) of a WiFi Network.

8. The building control device of claim 1, wherein in the configuration mode, the direct wireless connection comprises a WiFi connection.

9. The building control device of claim 1, wherein in the configuration mode, the direct wireless connection comprises a Bluetooth connection.

10. The building control device of claim 1, wherein the remote device comprises a smartphone or tablet running an application program.

11. The building control device of claim 10, wherein one or more of the updated network credentials are entered by a user via a user interface established by the application program.

12. A mobile device comprising:
- a wireless interface for wirelessly connecting the mobile device to a network that has one or more building automation devices connected to the network; and
- a controller comprising processing circuitry and operatively coupled to the wireless interface, the controller configured to:
  - identify when one or more network credentials of the network have changed, and when one or more network credentials of the network have changed, the controller is configured to automatically:
    - establish communication with each of one or more of the building automation devices; and
    - send one or more updated network credentials directly to each of one or more of the building automation devices, such that one or more of the building automation devices can reconnect with the network using the one or more updated network credentials.

13. The mobile device of claim 12, wherein the one or more network credentials comprises a passcode of a WiFi network and/or a Service Set Identifier (SSID) of a WiFi Network.

14. The mobile device of claim 12, wherein communication is established with one of the building automation devices via a temporary WiFi connection, with the temporary WiFi connection hosted by the one of the building automation devices.

15. The mobile device of claim 12, wherein communication is sequentially established with each of two or more of the building automation devices via two or more temporary connections, with each temporary connection is hosted by the building automation device with which the communication is established.

16. The mobile device of claim 12, wherein communication is established via a WiFi connection or a Bluetooth connection.

17. The mobile device of claim 12, wherein the one or more building automation devices comprises a thermostat.

18. The mobile device of claim 12, wherein the mobile device comprises a smartphone or tablet running an application program.

19. A building control device comprising:
- a wireless interface for wirelessly connecting the building control device to two or more networks in a building;
- a memory for storing network credentials for each of two or more networks in the building; and
- a controller for providing one or more control signals for controlling one or more building control components of a building automation system of the building;
- the controller comprising processing circuitry and operatively coupled to the wireless interface and the memory, the controller configured to:
  - connect the wireless interface of the building control device to a first network using one or more of the network credentials stored in the memory for a first one of the two or more networks;
  - monitor when the wireless interface becomes disconnected from the first network, and when the wireless interface becomes disconnected from the first network automatically connect the wireless interface of the building control device to a second network using one or more of the network credentials stored in the memory for a second one of the two or more networks.

20. The building control device of claim 19, wherein the first network is a WiFi network, and the second network is a WiFi network.

* * * * *